(12) United States Patent
Chitta et al.

(10) Patent No.: US 7,528,554 B2
(45) Date of Patent: May 5, 2009

(54) ELECTRONIC BALLAST HAVING A BOOST CONVERTER WITH AN IMPROVED RANGE OF OUTPUT POWER

(75) Inventors: Venkatesh Chitta, Center Valley, PA (US); Alexander J. Rovnan, Lancaster, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 45 days.

(21) Appl. No.: 11/801,860

(22) Filed: May 11, 2007

(65) Prior Publication Data
US 2008/0278086 A1    Nov. 13, 2008

(51) Int. Cl.
G05F 1/00 (2006.01)
H05B 41/36 (2006.01)

(52) U.S. Cl. ...................................... 315/291; 315/307
(58) Field of Classification Search ................. 315/291, 315/307, 200 R, 209 R, 224, 308, DIG. 5
See application file for complete search history.

(56) References Cited

U.S. PATENT DOCUMENTS

| | | | |
|---|---|---|---|
| 6,465,991 B1 | 10/2002 | Chang | |
| 6,674,248 B2 * | 1/2004 | Newman et al. | 315/247 |
| 6,707,261 B2 * | 3/2004 | Ito et al. | 315/224 |
| 6,784,622 B2 * | 8/2004 | Newman et al. | 315/219 |
| 7,061,189 B2 * | 6/2006 | Newman et al. | 315/291 |
| 7,075,254 B2 * | 7/2006 | Chitta et al. | 315/307 |
| 7,285,919 B2 * | 10/2007 | Newman et al. | 315/224 |
| 7,312,582 B2 * | 12/2007 | Newman et al. | 315/200 R |
| 2005/0035729 A1 | 2/2005 | Lev et al. | |
| 2005/0179404 A1 | 8/2005 | Veskovic et al. | |
| 2006/0125423 A1 | 6/2006 | Chitta et al. | |
| 2006/0125426 A1 | 6/2006 | Veskovic et al. | |
| 2006/0244392 A1 * | 11/2006 | Taipale et al. | 315/200 R |

OTHER PUBLICATIONS

European Patent Office, International Search Report and Written Opinion for International Application No. PCT/US2008/061507, Aug. 13, 2008, 10 pages.
Semiconductor Components Industries, LLC, NCP1601 Datasheet: Compact Fixed Frequency Discontinuous or Critical Conduction Mode Power Factor Correction Controller, Dec. 2005, 18 pages.

* cited by examiner

*Primary Examiner*—Douglas W Owens
*Assistant Examiner*—Minh D A
(74) *Attorney, Agent, or Firm*—Mark E. Rose; Philip N. Smith

(57) ABSTRACT

A boost converter for an electronic dimming ballast for driving a gas discharge lamp has an increased output power range. The boost converter operates in discontinuous conduction mode when a desired intensity of the lamp is below a first threshold intensity, and operates in critical conduction mode when the desired intensity is above a second threshold intensity. The boost converter comprises a delay circuit for introducing an amount of delay into the conduction of current through the boost converter. A control circuit of the ballast is operable to drive the delay circuit and thus control the operation of the boost converter in response to the desired intensity of the lamp. The control circuit is further operable to drive the delay circuit with a pulse-width modulated signal to provide multiple amounts of delay into the operation of the boost converter.

28 Claims, 14 Drawing Sheets

ELECTRONIC BALLAST HAVING A BOOST CONVERTER WITH AN IMPROVED RANGE OF OUTPUT POWER

BACKGROUND OF THE INVENTION

1. Field of the Invention

The present invention relates to an electronic ballast for controlling the intensity of a gas discharge lamp, specifically, an electronic dimming ballast having a boost converter adapted to operate over an increased range of output power.

2. Description of the Related Art

In order for a gas discharge lamp, such as a fluorescent lamp, to illuminate, the lamp is typically driven by a ballast. Electronic ballasts receive alternating-current (AC) mains line voltage from an AC power source and convert the AC mains line voltage to an appropriate voltage waveform to drive the lamp.

FIG. 1 is a simplified block diagram of a prior art electronic ballast 10 for driving a fluorescent lamp 15. The electronic ballast 10 comprises a "front-end" circuit 20 and a "back-end" circuit 40. The front-end circuit 20 includes a radio-frequency interference (RFI) filter 22 for minimizing the noise provided on the AC mains and a full-wave rectifier 24 for receiving the AC mains line voltage (e.g., 120 $V_{AC}$) and generating a rectified voltage. The front-end circuit 20 also includes a boost converter 26, which boosts the magnitude of the rectified voltage above the peak of the line voltage to produce a direct-current (DC) bus voltage 32. The boost converter 26 also improves the total harmonic distortion (THD) and the power factor of the input current to the ballast 10.

The front end circuit 20 provides the DC bus voltage 32 to the back end circuit 40. A bus capacitor 30 (i.e., an energy storage device) is provided between the front end circuit 20 and the back end circuit 40 for filtering the DC bus voltage 32 and has a capacitance of, for example, 15 μF. The ballast back-end circuit 40 includes a switching inverter 42 for converting the DC bus voltage 32 to a high-frequency AC voltage, and an output circuit 44 (e.g., a resonant tank circuit having a relatively high output impedance) for coupling the high-frequency AC voltage to the electrodes of the lamp 15.

The ballast 10 further comprises a control circuit 50, which controls the operation of the switching inverter 42 and thus the intensity of the lamp 15. The control circuit 50 receives a phase control input (e.g., a phase controlled signal provided by a dimmer circuit) through a resistor R52 and a diode D54. The resistor R52 (e.g., 200 kΩ) forms a resistor divider with a resistor R56 (e.g., 6.67 kΩ) to scale the magnitude of the phase control input down to a level appropriate for the control circuit 50 to process. The phase control input is also provided to the boost converter 26. A power supply 58 is coupled to the output of the rectifier 24 and generates a DC voltage $V_{CC}$ (e.g., approximately 15 $V_{DC}$) for powering the control circuit 50 and other low-voltage circuitry of the ballast 10.

The phase control input is representative of a desired intensity of the fluorescent lamp 15. The phase control input is preferably equal to substantially zero volts for a first portion of a half-cycle of the AC power source and equal to substantially the AC mains voltage for the rest of the half-cycle. The control circuit 50 is operable to control the intensity of the lamp 15 in response to amount of time that the phase control input is substantially equal to the AC mains voltage each half-cycle. The control circuit 50 is operable to control the intensity across a dimming range of the lamp 15 from a low-end (LE) intensity (i.e., a minimum non-zero intensity, such as 1%) to a high-end (HE) intensity (e.g., a maximum intensity, such as 100%).

FIG. 2 is a simplified schematic diagram of the boost converter 26 of the ballast 10. The output of the rectifier 24 is supplied to an inductor L1 (e.g., 810 μH), which is coupled in series with a boost diode D1 whose cathode is coupled to the bus capacitor 30. A power switching field-effect transistor (FET) Q1 (e.g., part number IRFS840 manufactured by International Rectifier) is coupled to the junction of the inductor L1 and the anode of the diode D1 to circuit common through a current sense resistor R1 (e.g., 0.281Ω). A control integrated circuit (IC) U1 (e.g., part number TDA4862 manufactured by Infineon Technologies) controls the operation of the transistor Q1. Specifically, a drive pin GTDRV of the control IC U1 is coupled to the gate of the transistor Q1 through a delay circuit 60, which will be described in greater detail below. The transistor Q1 is switched at a high frequency (e.g., 30 kHz) to provide the desired DC voltage across the bus capacitor 30, to achieve power factor correction (PFC) so that the AC input current to the ballast 10 closely follows the AC mains line voltage, and to minimize total harmonic distortion (THD) by maintaining the input current wave shape as sinusoidal. To prevent audible noise from being generated, the boost converter 26 preferably does not operate at a frequency of less than 20 KHz.

A first resistor divider provides an input pin MULTIN of the control IC U1 with a signal representative of the rectified voltage. The first resistor divider comprises two resistors R2, R3 having resistances of, for example, 996 kΩ and 10 kΩ, respectively. In order to achieve the desired magnitude of the bus voltage 32, the control IC 34 monitors a feedback voltage at a feedback pin $V_{SENSE}$. The feedback voltage is produced by a second voltage divider comprising two resistors R4, R5 (e.g., 1.86 MΩ and 10 kΩ, respectively), and is also provided to a pin $V_{AOUT}$ of the control IC U1 through a capacitor C1 (e.g., 100 nF).

The boost converter 26 preferably operates in critical conduction mode, rather than continuous or discontinuous conduction modes. In continuous conduction mode, the current through the inductor L1 is continuous and does not fall to zero amps. In contrast, discontinuous conduction mode allows for the current through the inductor L1 to fall to zero amps and remain at zero for a period of time each switching cycle of the boost converter. Critical conduction mode is at the intersection of continuous and discontinuous conduction modes. The current through the inductor L1 is allowed to fall to zero amps, but does not remain at zero amps for a significant amount of time. The use of critical conduction mode in the boost converter 26 most effectively minimizes THD of the ballast 10 and provides a good trade-off between conduction losses and switching losses of the boost converter.

FIG. 3A is a current waveform 70 of the current through the inductor L1 while the boost converter 26 is operating in critical conduction mode. When the transistor Q1 is conductive, a current flows through the inductor L1, the transistor Q1, and the resistor R1, and increases with respect to time. A pin $I_{SENSE}$ of the control IC U1 receives the voltage across the resistor R1, which is representative of the current through the resistor R1 and the inductor L1. In critical conduction mode, the charging current through the inductor L1 increases to a threshold current $I_{TH}$, then decreases to zero amps, before immediately beginning to increase once again.

When the current through the inductor L1 exceeds the threshold current $I_{TH}$, the control IC U1 renders the transistor Q1 non-conductive. The current through the inductor begins to decrease as shown in FIG. 3A. An auxiliary winding L2 is magnetically coupled to the inductor L1 and is provided to a zero-cross detect pin DETIN of the control IC U1 through a resistor R6 (e.g., 22 kΩ). Using the input provided by the zero-cross detect pin DETIN, the control IC U1 is operable to determine when the current through the inductor L1 reaches zero amps. In response, the control IC U1 once again renders the transistor Q1 conductive to begin charging the inductor L1.

It is desirable that a dimming ballast be able to provide a wide range of output power. For example, a single ballast may be required to provide a rather large amount of output power to a lamp (or multiple lamps) at the high-end intensity, and then provide a rather low amount of output power at the low-end intensity (e.g., 1%). If the ballast has a wide range of output power, the ballast must also have a wide range of input power. FIG. 4 is a plot of a desired input power of a dimming ballast versus the intensity of the connected fluorescent lamp. The ballast and the lamp may consume a rather large amount of input power (e.g., 120 W) at the high-end intensity, and a small amount of power (e.g., 6 W) at the low-end intensity (e.g., 1%).

Typical boost converter control ICs (such as the control IC U1) are limited by some specific characteristics, such as a minimum on-time to which the transistor Q1 can be controlled conductive (e.g., 250 nsec). Since the transistor Q1 must be conductive for at least the minimum on-time, the output power of the boost converter cannot drop below a minimum output power level. The input power of the boost converter 26 is equal to the output power of the boost converter plus the losses of the boost converter (e.g., typically 2-3 W). The input power of the ballast 10 is substantially equal to the input power of the boost converter 26. Therefore, the minimum output power level of the boost converter 26 establishes a minimum input power level for the ballast 10, which may be, for example, 10 W if the minimum on-time of the control IC U1 is 250 nsec. For example, if the minimum input power of the control IC U1 is 10 W, the minimum lamp intensity may be approximately 3%, as shown in FIG. 4.

If the lamp 15 is controlled below approximately 3% such that the output power of the boost converter 26 drops below the minimum output power level, the boost converter begins to operate in burst mode, in which additional voltage ripple is generated on the DC bus voltage 32, i.e., across the bus capacitor 30. This voltage ripple can then cause the lamp 15 to flicker. Therefore, the minimum on-time limitation of the control IC U1 affects the range of output power able to be provided by the ballast 10. In other words, if the ballast 10 is designed to drive a high-power lamp, the ballast may not be able dim the intensity of the lamp 15 to a low light level, such as 1% intensity, without flicker.

In order to decrease the input power of the boost converter 26 below the minimum level determined by the minimum on-time limitation of the control IC U1, the boost converter includes the delay circuit 60 to introduce some delay into the operation of the boost converter to thus cause the boost converter to begin operating in discontinuous conduction mode. Referring back to FIG. 2, the phase control input is provided to the delay circuit 60, such that the delay circuit 60 is operable to control the operation of the transistor Q1 in response to the desired intensity of the lamp 15. When the current through the inductor L1 decreases to zero amps, the control IC U1 attempts to render the transistor Q1 conductive by driving the drive pin GTDRV high (i.e., approximately the magnitude of the DC voltage $V_{CC}$). The delay circuit 60 delays when the transistor Q1 begins to conduct by a delay time $t_{DELAY}$, which is dependent upon the desired lamp intensity. FIG. 3B is a current waveform 72 of the current through the inductor L1 showing the delay time $t_{DELAY}$.

The boost converter 26 further comprises a field-effect transistor Q2 having a gate coupled to the drive pin GTDRV of the control IC U1 through a resistor R7 (e.g., 1 kΩ). When the control IC U1 drives the drive pin GTDRV high, the transistor Q2 is rendered conductive and maintains the zero-cross detect pin DETIN at substantially circuit common, such that the control IC U1 continues to maintain the drive pin GTDRV high. Accordingly, the ballast 10 is operable to drive the intensity of the lamp 15 down to approximately 1% since the delay circuit 60 allows the input power of the boost converter 26 to drop below the minimum input power level determined by the minimum on-time of the control IC U1.

FIG. 5 is a simplified schematic diagram of the delay circuit 60. The delay circuit 60 comprises a phase control-to-DC-voltage circuit 62, a gate drive comparison circuit 64, and a drive circuit 66. The delay circuit 60 receives a phase control signal PH_CNTL from the phase control input and a gate drive control signal GATE_DRV from the drive pin GTDRV of the control IC U1. The delay circuit 60 provides a drive signal DLY_OUT to the gate of the transistor Q1.

The phase control signal PH_CNTL is coupled to a negative input of a comparator U10 (e.g., part number LM2903 manufactured by National Semiconductor). A resistor divider comprising two resistors R10, R12 is coupled between the DC voltage $V_{CC}$ and circuit common. For example, the resistors R10, R12 have resistances of 10 kΩ and 2.2 kΩ, such that the resistor divider provides a reference voltage of approximately 2.7 V to a positive input of the comparator U10. When the phase control signal PH_CNTL is below the reference voltage, the output of the comparator U1 is driven to approximately circuit common. When the phase control signal PH_CNTL rises above the reference voltage, the output of the comparator U10 is pulled up to substantially the DC voltage $V_{CC}$ through a resistor R14 (e.g., 10 kΩ). Since the phase control signal PH_CNTL is simply a scaled version of the phase control input provided to the ballast, the output of the comparator U10 is equal to substantially zero volts for a first portion of each half-cycle and equal to substantially the DC voltage $V_{CC}$ for the rest of each half-cycle. In other words, the voltage at the output of the comparator U10 has a duty cycle that is dependent upon the desired intensity of the lamp 15.

The output of the comparator U1 is provided to a low-pass filter, comprising a resistor R16 (e.g., 10 kΩ) and a capacitor C12 (e.g., 10 µF), which filters the output of the comparator to produce a substantially DC voltage. Since the duty cycle of the voltage at the output of the comparator is dependent upon the desired intensity of the lamp 15, the magnitude of the DC voltage produced by the low-pass filter is also dependent upon the desired intensity of the lamp. Therefore, the phase control-to-DC-voltage circuit 62 generates a substantially DC voltage having a magnitude responsive to the phase control signal PH_CNTL.

The filtered DC voltage from the low-pass filter is provided to the gate drive comparison circuit 64, which also receives the gate drive control signal GATE_DRV. The filtered DC voltage is coupled to a negative input of a comparator U12 through a zener diode Z10 having of breakover voltage of, for example, 5.6 V. The negative input of a comparator U12 is coupled to circuit common through a resistor R18 (e.g., 44.2 kΩ). The filtered DC voltage is provided as a reference voltage for the comparator U12.

The gate drive control signal GATE_DRV is coupled to a positive input of the comparator U12 through a resistor R20 (e.g., 6.34 kΩ), which forms a low-pass filter with a capacitor C12 (e.g., 1 nF). When the gate drive control signal GAT- E_DRV transitions from low to high (i.e., the control IC U1 is attempting to control the transistor Q1 to become conductive), the voltage across the capacitor C12 is initially substantially zero volts and the output of the comparator U12 is held to approximately circuit common. Since the gate drive control signal GATE_DRV is high, the voltage at the positive input of the comparator U12 increases with respect to time. When the voltage at the positive input of the comparator U12 rises above the voltage at the negative input of the comparator (which is dependent upon the desired intensity of the lamp 15), the output of the comparator is allowed to rise up to the gate drive control signal GATE_DRV (i.e., pulled up by a resistor R22, e.g., 10 kΩ). When the gate drive control signal GATE_DRV is once again driven low, the capacitor C12 discharges quickly through a diode D10.

The output of the comparator U12 is provided to the drive circuit 66, which comprises a standard totem-pole structure. The drive circuit 66 comprises an NPN bipolar transistor Q10 (e.g., part number MPSA06) and a PNP bipolar transistor Q12 (e.g., part number 2N3906). The emitters of the transistors Q10, Q12 are coupled together and provide the drive signal DLY_OUT through a resistor R26 (e.g., 100Ω). The junction of the emitters is also coupled to the gate drive control signal GATE_DRV via a diode D12. When the output of the comparator is low, the transistor Q12 pulls the drive signal DLY_OUT down to substantially circuit common. When the output of the comparator U12 is high, the transistor Q10 pulls the drive signal DLY_OUT up to substantially the gate drive control signal GATE_DRV.

Therefore, the low-pass filter comprising the resistor R16 and the capacitor C12 provides an amount of delay into the drive signal DLY_OUT to the transistor Q1. The amount of delay is responsive to the desired intensity of the lamp 15. When the delay circuit 60 introduces the delay into the current through the inductor L1, the boost converter 26 operates in discontinuous conduction mode. Since the boost converter 26 is operating in discontinuous conduction mode, the conduction losses of the boost converter and the THD of the ballast 10 both increase in comparison to when the boost converter is operating in critical conduction mode. However, the ballast 10 is operable to drive the intensity of the lamp 15 down to a low intensity (such as 1%) without flicker from burst mode operation.

FIG. 6 is a plot of the amount of delay provided by the delay circuit 60 versus the desired intensity of the lamp 15. Even though the delay is only required in the current through the inductor L1 when the desired intensity is substantially low, i.e., below 10%, the delay circuit 60 introduces delay into the operation of the boost converter 26 across the dimming range of the lamp 15. Because of limitations of the comparator U10, the filtered DC voltage provided by the phase control-to-DC-voltage circuit 62 cannot be driven to zero volts. Therefore, the drive signal DLY_OUT provided by the delay circuit 60 always have some amount of delay (e.g., 1 μsec). Accordingly, the delay can never be zero seconds and the boost converter 26 can never operate in critical conduction mode.

In order for the ballast 10 to receive a wide range of input voltage (e.g., from approximately 90 to 300 $V_{AC}$), the resistances of the resistors R10, R12 must be changed in order to change the magnitude of the reference voltage provided to the comparator U10. Therefore, the ballast 10 cannot be offered as a universal-input ballast that is operable to receive a wide range of input voltages.

Thus, there is a need for a universal-input electronic dimming ballast having a boost converter that typically operates in critical conduction mode, but only operates in discontinuous conduction mode when the desired lamp intensity is below a predetermined intensity.

SUMMARY OF THE INVENTION

According to an embodiment of the present invention, an electronic dimming ballast for driving a gas discharge lamp comprises a rectifier, a boost converter, an inverter, and a control circuit. The rectifier receives an AC input voltage from an AC supply and produces a rectified voltage having a peak magnitude. The boost converter receives the rectified voltage, produces a substantially DC bus voltage having a DC magnitude greater than the peak magnitude of the rectified voltage, and operates in critical conduction mode. The inverter converts the DC bus voltage to a high-frequency AC output voltage to drive the lamp. The control circuit receives a desired light level signal representative of a desired intensity of the lamp, and provides a first control signal to the inverter and a second control signal to the boost converter. The boost converter operates in discontinuous conduction mode when the desired intensity of the lamp is below a first threshold intensity.

The present invention further provides a boost converter for an electronic ballast for driving a gas discharge lamp to a desired intensity. The boost converter receives a rectified voltage and charges a bus capacitor to produce a substantially DC bus voltage having a DC magnitude greater than a peak magnitude of the rectified voltage. The boost converter comprises a semiconductor switch, an energy storage element (e.g., an inductor), and a control circuit. The energy storage element charges when the semiconductor switch is conductive and discharges into the bus capacitor when the semiconductor switch is non-conductive. The control circuit is operatively coupled to the control input of the semiconductor switch to render the semiconductor switch conductive and non-conductive to selectively charge and discharge the energy storage element, such that the boost converter operates in critical conduction mode. The control circuit is further operable to control the semiconductor switch to operate the boost converter in discontinuous conduction mode when the desired intensity of the lamp is below a first threshold intensity.

In addition, the present invention provides a method of boosting a rectified voltage to produce a substantially DC bus voltage using a boost converter of an electronic ballast for driving a gas discharge lamp. The method comprises the steps of: (1) receiving a desired intensity of the lamp; (2) operating the boost converter in critical conduction mode; (3) determining if the desired intensity is below a first threshold intensity; and (4) operating the boost converter in discontinuous conduction mode when the desired intensity of the lamp is below the first threshold intensity.

According to another aspect of the present invention, an electronic dimming ballast for driving a gas discharge lamp comprises: (1) a rectifier operable to receive an AC input voltage from an AC supply and to produce a rectified voltage having a peak magnitude; (2) a boost converter operable to receive the rectified voltage, to produce a substantially DC bus voltage having a DC magnitude greater than the peak magnitude of the rectified voltage, and to operate in critical conduction mode; (3) an inverter operable to convert the DC bus voltage to a high-frequency AC output voltage to drive the lamp; and (4) a control circuit operable to receive a desired light level signal representative of a desired intensity of the lamp, and to provide a first control signal to the inverter and a second control signal to the boost converter, such that the boost converter operates in discontinuous conduction mode when the desired intensity of the lamp is below a first threshold intensity. The boost converter is characterized by a minimum input power and a maximum input power, where the ratio of the maximum input power over the minimum input power is greater than 20.

Other features and advantages of the present invention will become apparent from the following description of the invention that refers to the accompanying drawings.

DETAILED DESCRIPTION OF THE INVENTION

Figure 1:
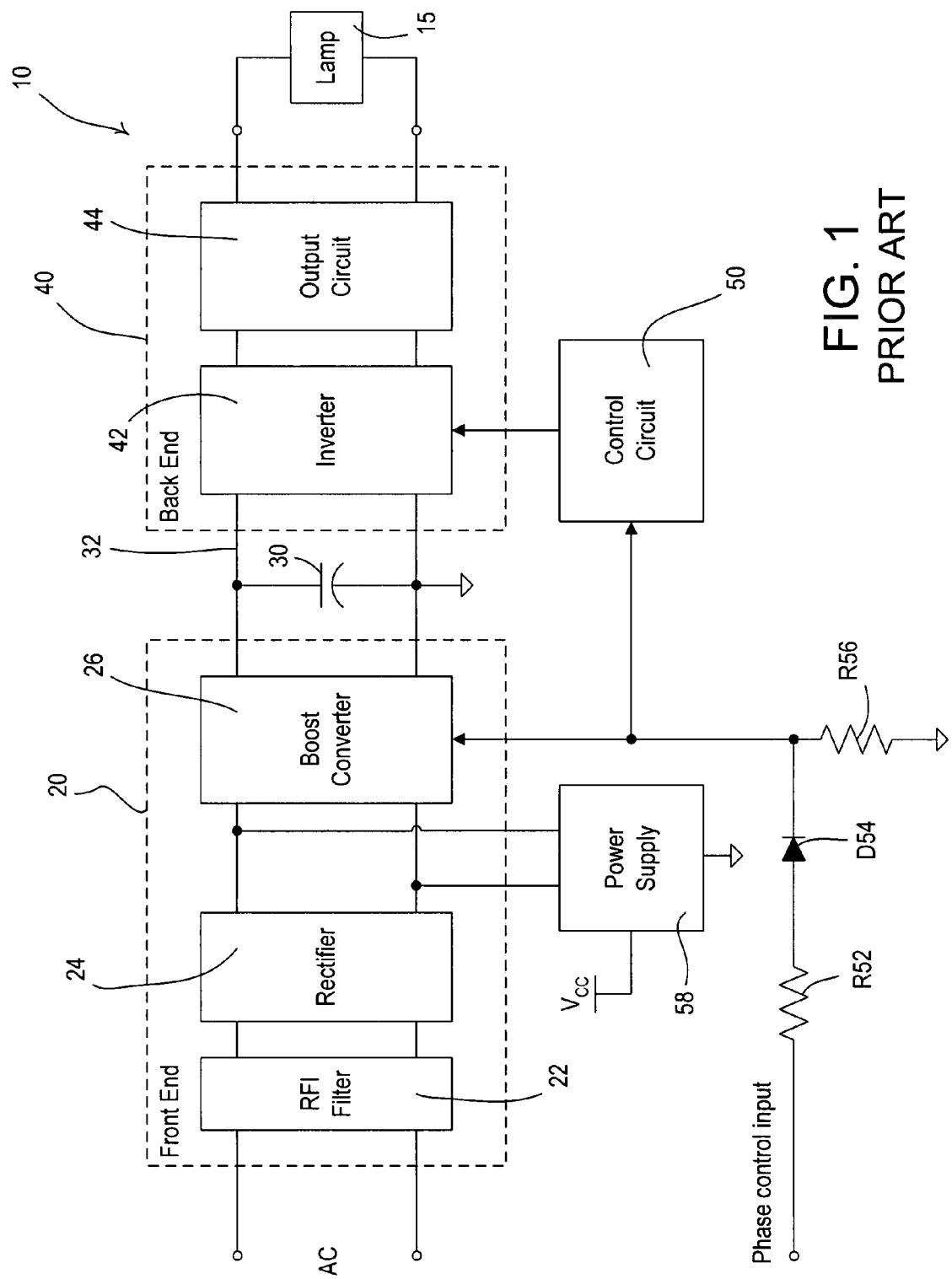
FIG. 1 is a simplified block diagram of a prior art electronic ballast for driving a fluorescent lamp.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 7:
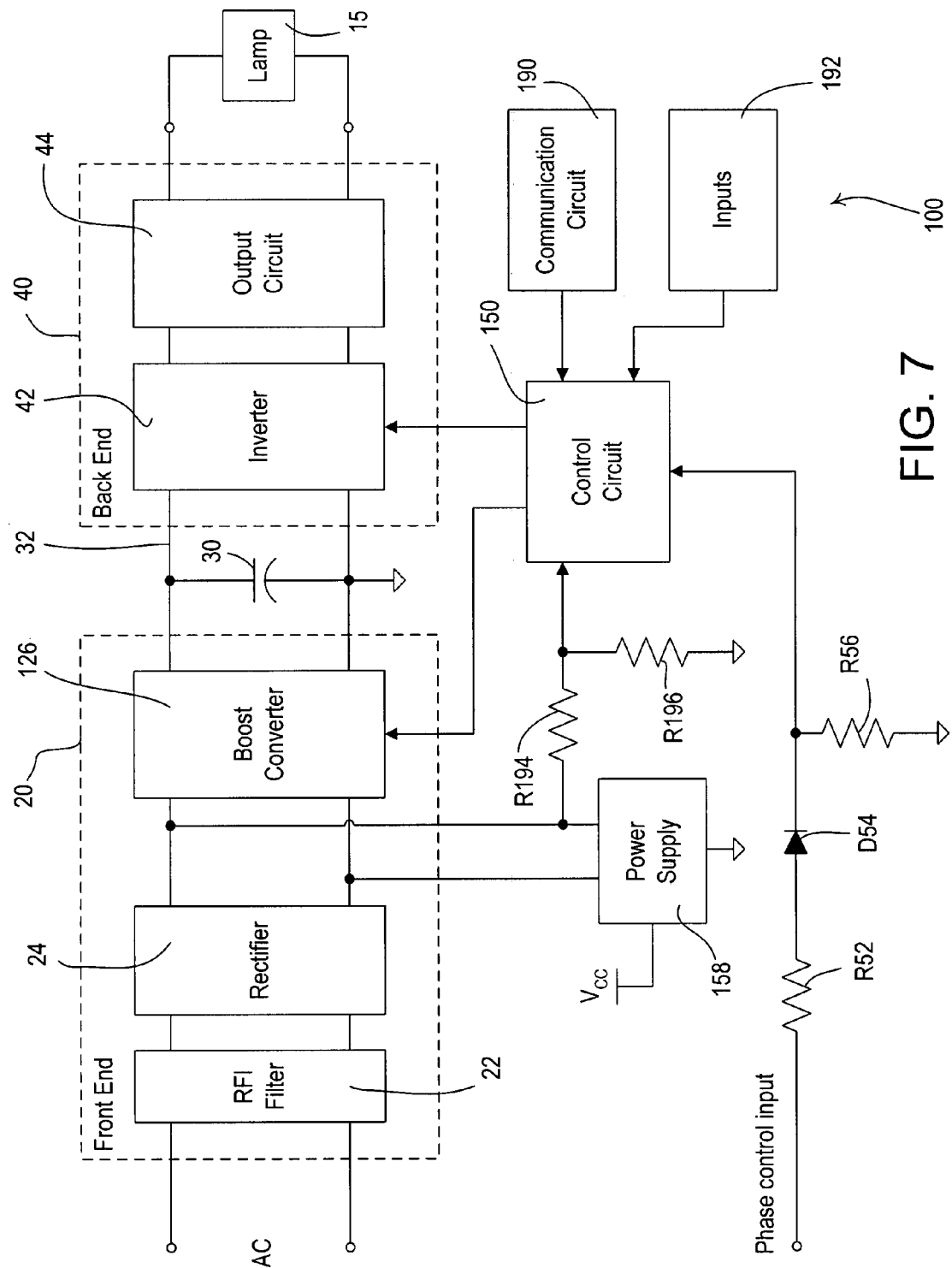
FIG. 7 is a simplified block diagram of an electronic dimming ballast for driving a fluorescent lamp according to the present invention.

FIG. 7 is a simplified block diagram of an electronic dimming ballast 100 for driving a fluorescent lamp 105 according to the present invention. The electronic dimming ballast 100 operates in a similar manner as the prior art electronic dimmer ballast 10 of FIG. 1 and includes many similar blocks, which have the same function as described previously. Only those components of the ballast 100 of the present invention that differ from the prior art ballast 10 will be described in greater detail below.

The ballast 100 of the present invention comprises a boost converter 126, which is controlled by a control circuit 150, as will be described in greater detail below. The control circuit 150 preferably comprises a microprocessor, but may comprise any suitable type of controller, such as, for example, a programmable logic device (PLD), a microprocessor, or an application specific integrated circuit (ASIC). The ballast 100 further comprises a communication circuit 190 and a plurality of inputs 192 for receipt of control signals from a plurality of external devices (not shown), such as, for example, occupancy sensors, daylight sensors, infrared (IR) receivers, or keypads. A power supply 158 generates a DC voltage $V_{CC}$ having a magnitude appropriate to power the control circuit 150 (e.g., 5 $V_{DC}$).

The control circuit 150 is coupled to the phase control input, the communication circuit 190, and the plurality of inputs 192, such that the control circuit is operable to control the operation of the inverter 42 and the boost converter 126 in response to the phase control input, digital messages received via the communication circuit, or inputs received from the plurality of inputs. An example of a digital electronic dimming ballast operable to be coupled to a communication link and a plurality of other input sources is described in greater detail in co-pending commonly-assigned U.S. patent application Ser. No. 10/824,248, filed Apr. 14, 2004, entitled MULTIPLE-INPUT ELECTRONIC BALLAST WITH PROCESSOR, and U.S. patent application Ser. No. 11/011,933, filed Dec. 14, 2004, now U.S. Pat. No. 7,369,060, entitled DISTRIBUTED INTELLIGENCE BALLAST SYSTEM AND EXTENDED LIGHTING CONTROL PROTOCOL. The entire disclosures of both applications are hereby incorporated by reference.

The control circuit 150 of the present invention is also responsive to the magnitude of the AC mains line voltage. Specifically, the control circuit 150 receives a signal representative of the magnitude of the rectified voltage provided by the rectifier 24 from a resistor divider comprising two resistors R194, R196. Preferably the resistances of the resistors R194, R196 are 996 kΩ and 10 kΩ, respectively.

Figure 2:
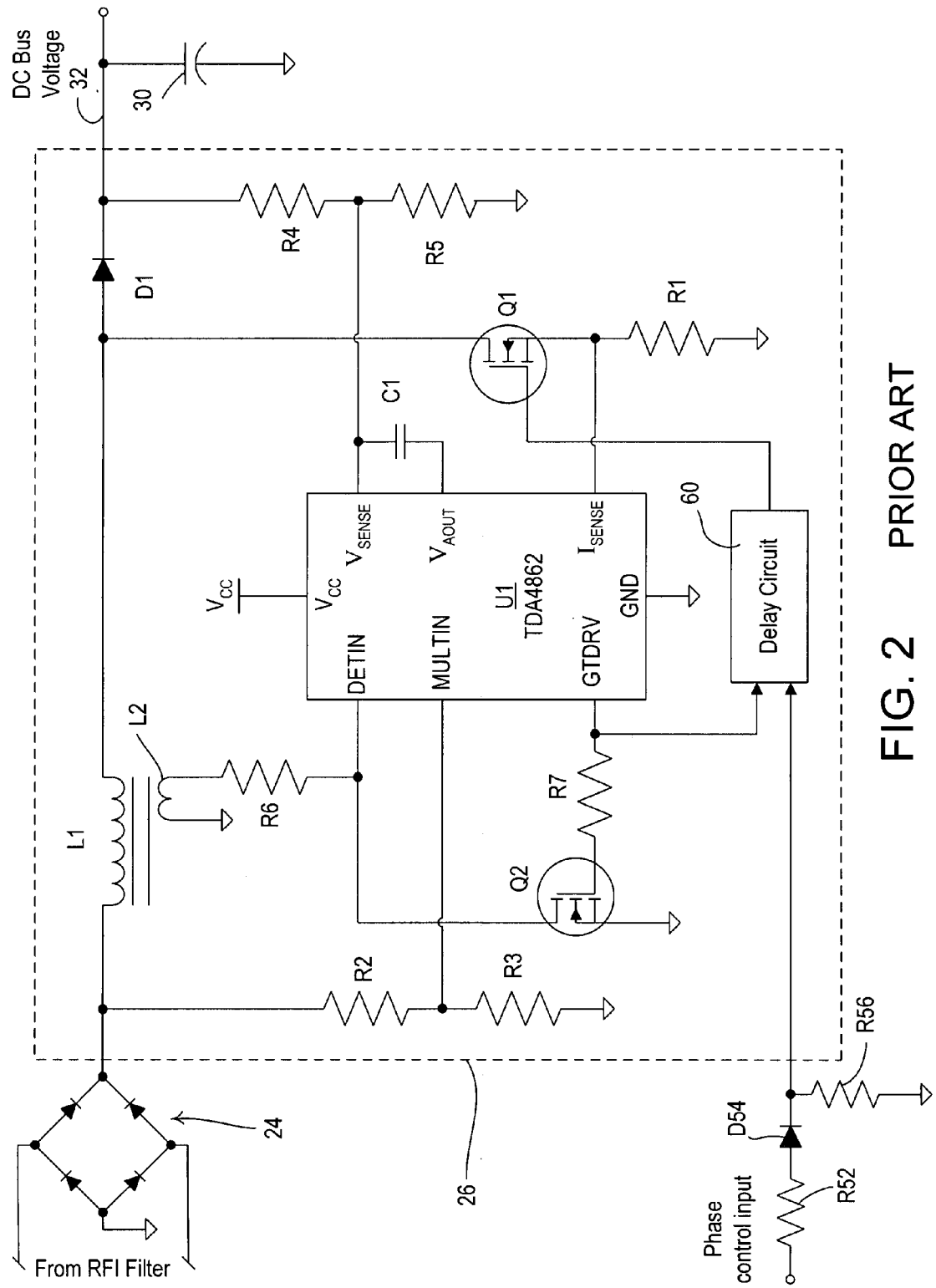
FIG. 2 is a simplified schematic diagram of a boost converter of the ballast of FIG. 1.
Figure 3A:
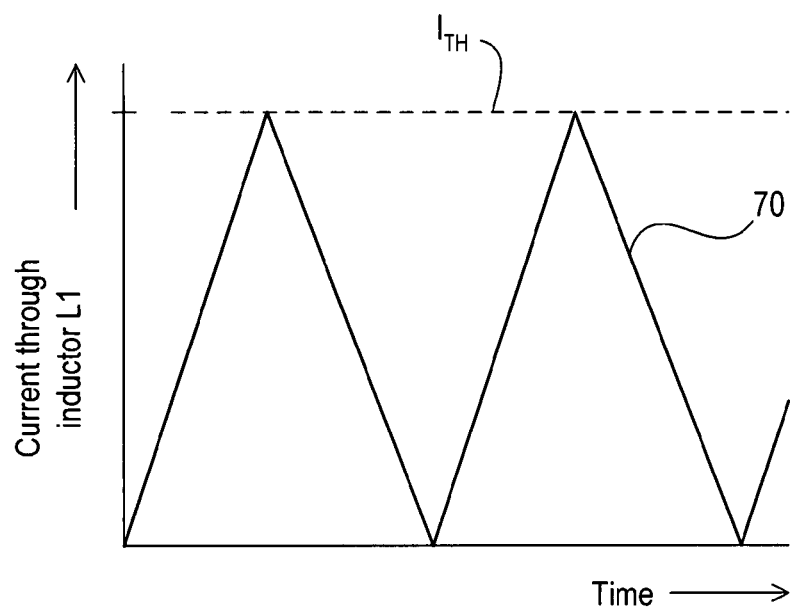
FIG. 3A is a current waveform of the current through an inductor of the boost converter of FIG. 2 when the boost converter is operating in critical conduction mode.
Figure 3B:
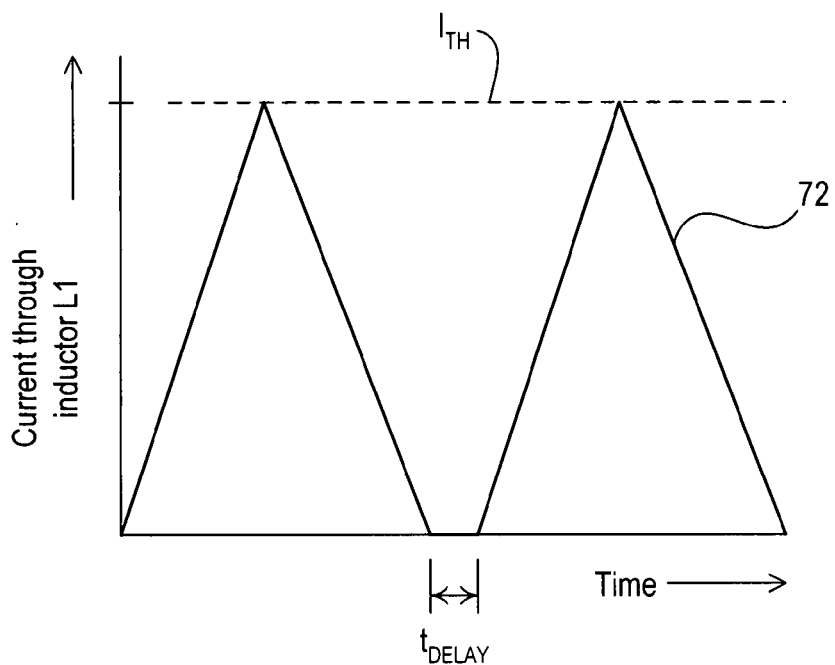
FIG. 3B is a current waveform of the current through the inductor of the boost converter of FIG. 2 when the boost converter is operating in discontinuous conduction mode.
Figure 4:
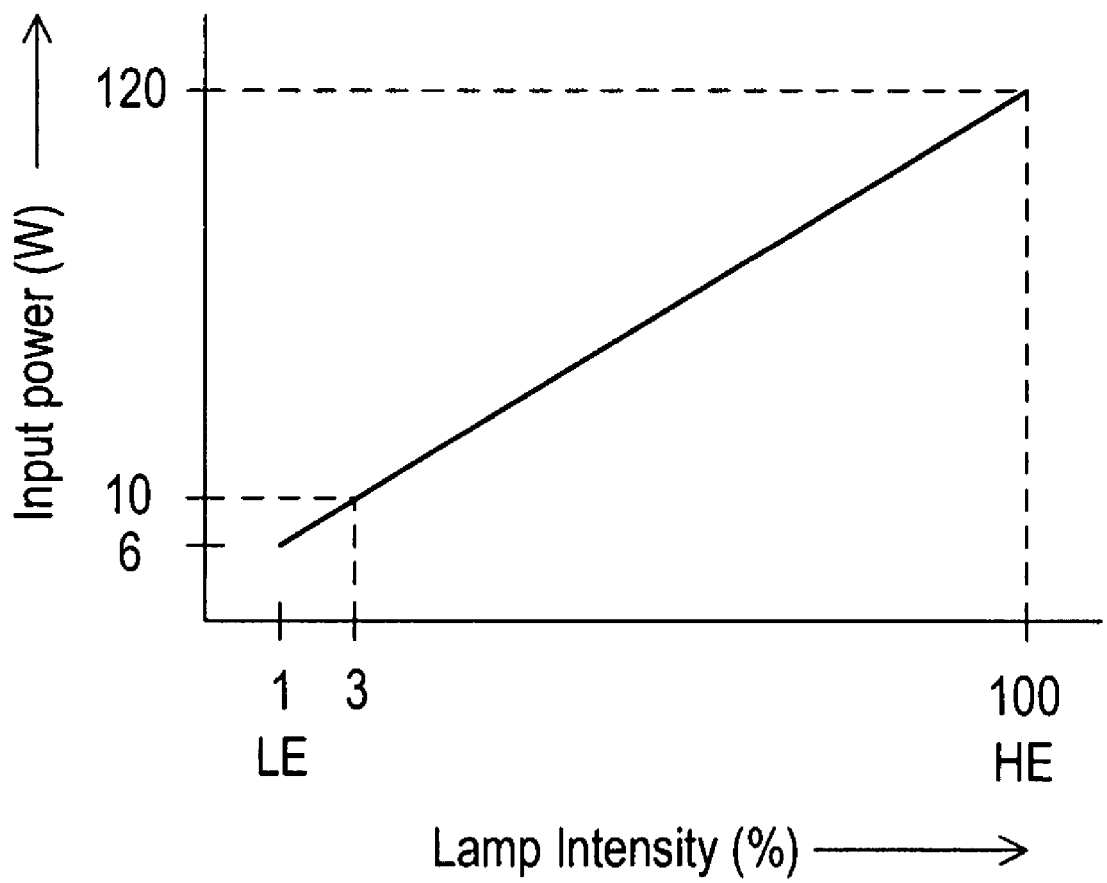
FIG. 4 is a plot of the input power of a typical ballast versus the intensity of the the fluorescent lamp.
Figure 8:
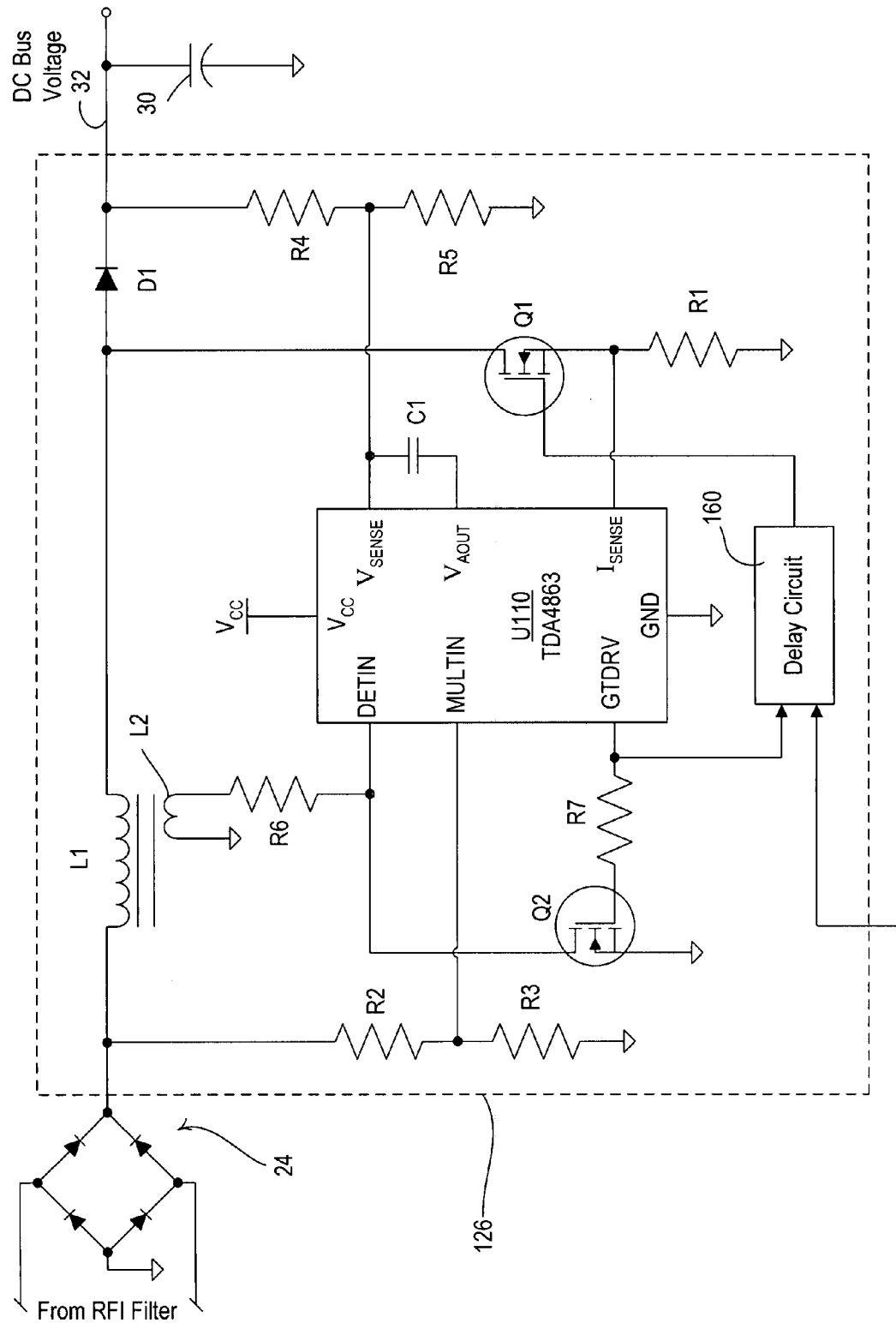
FIG. 8 is a simplified block diagram of a boost converter of the ballast of FIG. 7.

FIG. 8 is a simplified block diagram of the boost converter 126, which is very similar to the boost converter 26 of the prior art ballast 10 (as shown in FIG. 2). Only the components of the boost converter 126 that differ from the boost converter 26 of the prior art ballast 10 will be described in greater detail herein. The boost converter 126 comprises a control IC U110, e.g., preferably part number TDA4863 (manufactured by Infineon Technologies), which is able to operate across a wide range of input voltages. A delay circuit 160 is coupled to a drive pin GTDRV of the control IC U110 and receives a control signal BST_DLY directly from the control circuit 150.

Figure 5:
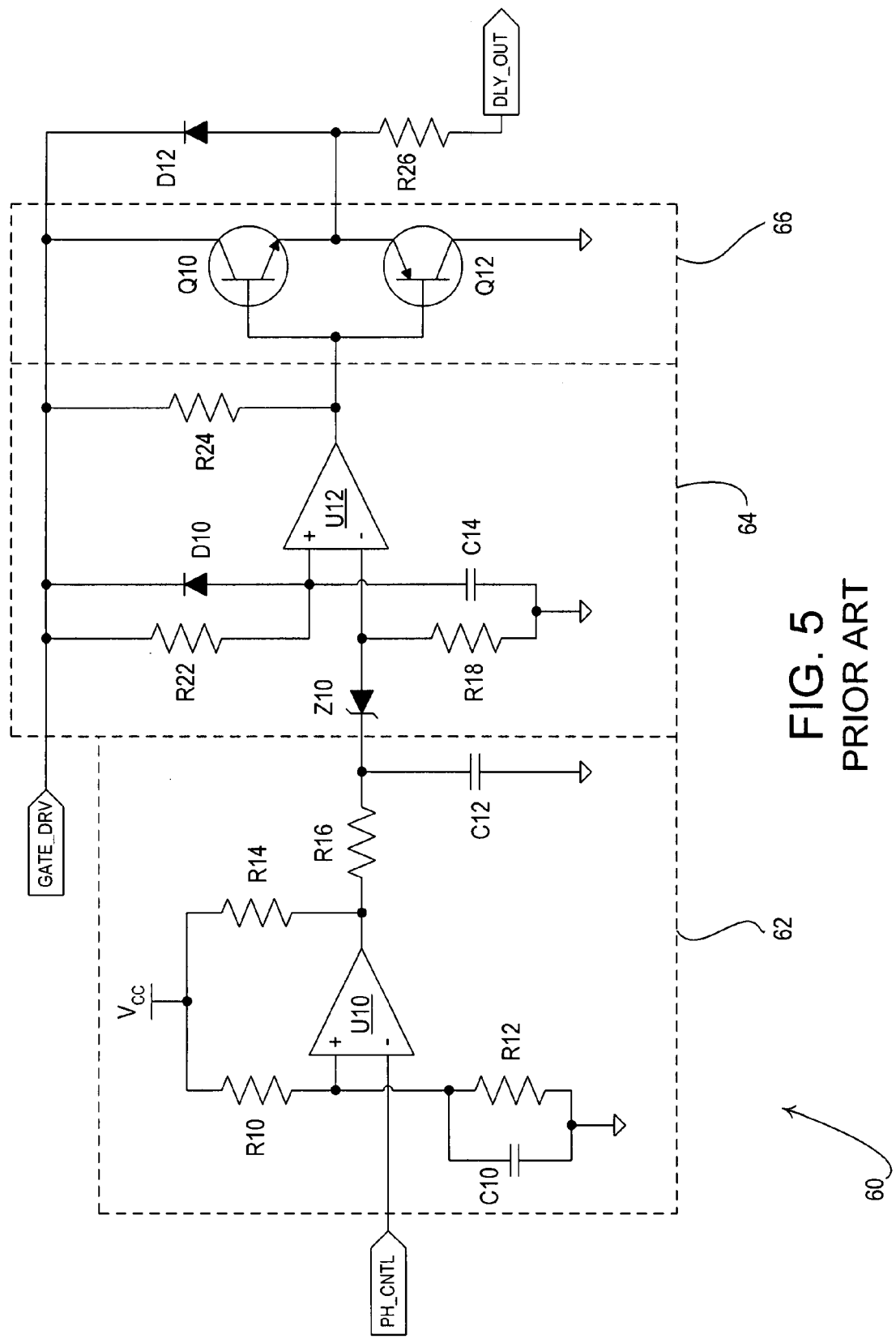
FIG. 5 is a simplified schematic diagram of a delay circuit of the boost converter of FIG. 2.
Figure 6:
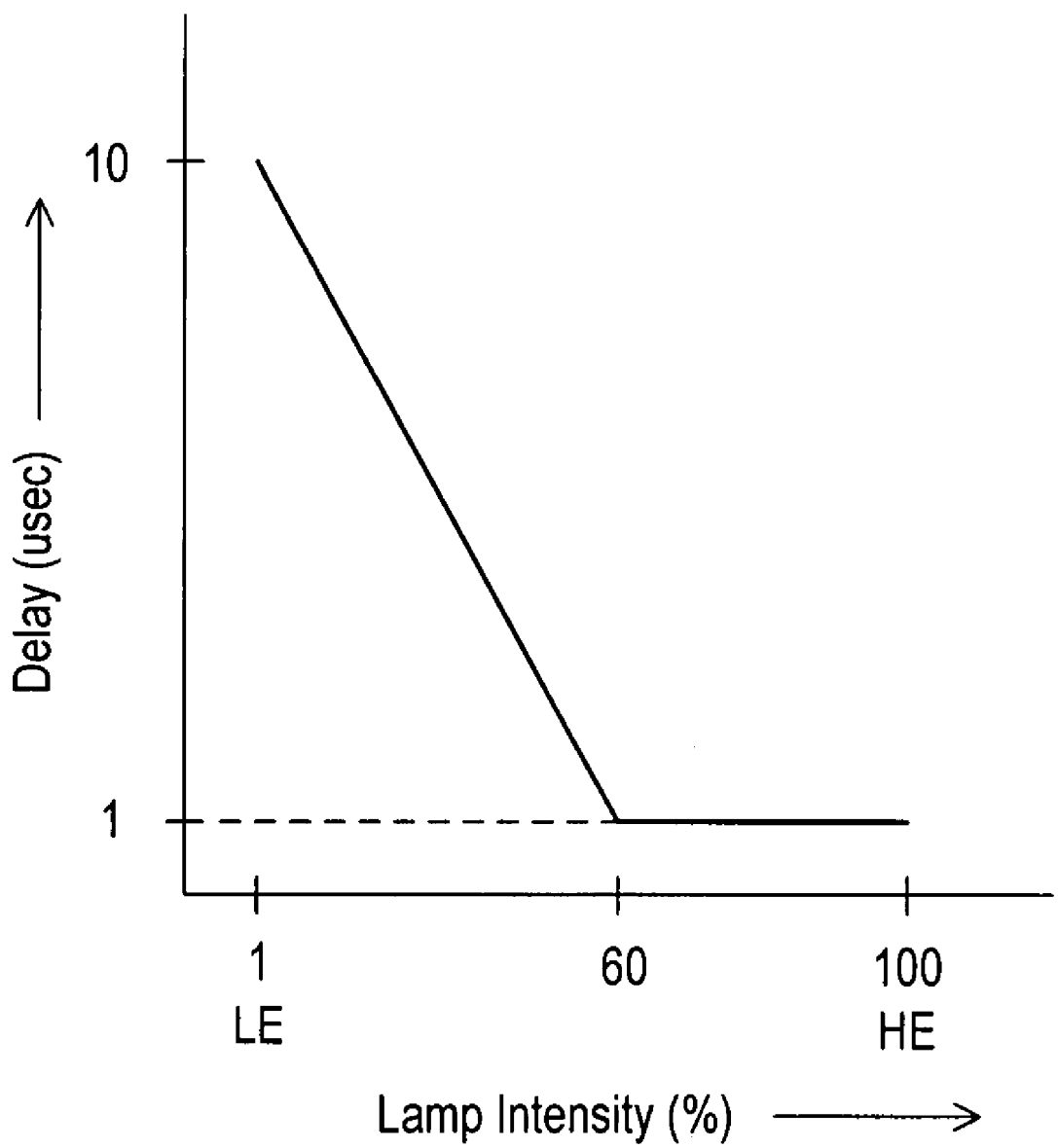
FIG. 6 is a plot of an amount of delay provided by the delay circuit of FIG. 5 versus the desired intensity of the fluorescent lamp.
Figure 9:
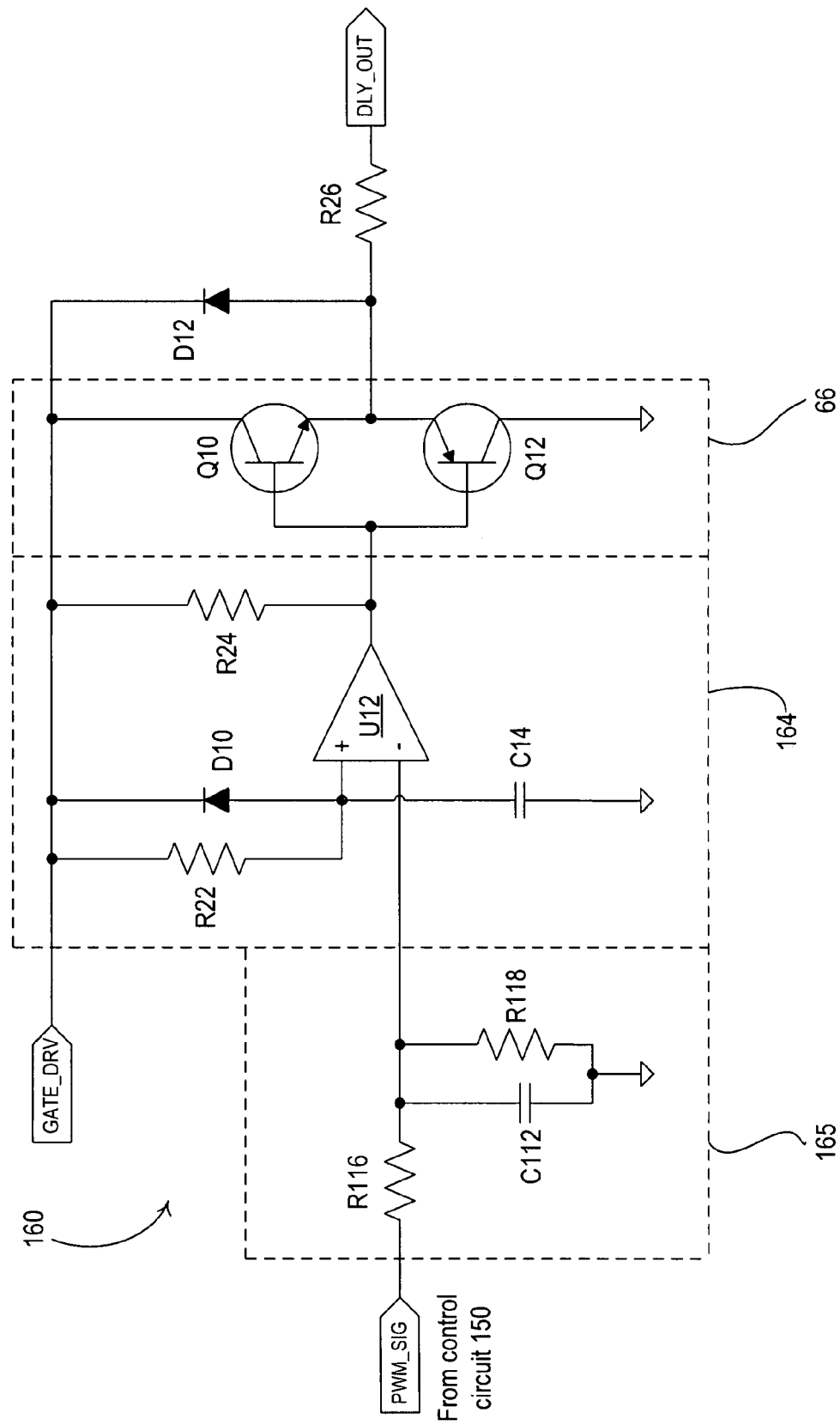
FIG. 9 is a simplified block diagram of a delay circuit of the boost converter of FIG. 8.

FIG. 9 is a simplified block diagram of the delay circuit 160, which is very similar to the delay circuit 60 of the prior art ballast 10 (as shown in FIG. 5). Once again, only the components of the delay circuit 160 that differ from the delay circuit 60 of the prior art ballast 10 will be described in greater detail herein. Since the delay circuit 160 according to the present invention does not receive the phase control signal PH_CNTL, the delay circuit does not include the phase control-to-DC-voltage circuit 62 of the prior art delay circuit 60.

The control signal BST_DLY from the control circuit 150 is simply coupled to the gate drive comparison circuit 64 through a low-pass filter 165 comprising two resistors R116, R118, and a capacitor C112. Preferably, the resistors R116, R118 have resistances of 392 kΩ and the capacitor C112 has a capacitance of 1.0 µF. The control circuit 150 preferably provides the control signal BST_DLY with a duty cycle dependent upon the desired intensity of the lamp 15. The low-pass filter 165 filters the control signal BST_DLY to produce a substantially DC voltage. A gate drive comparison circuit 164 receives the gate drive control signal GATE_DRV, which is compared to the DC voltage produced by the low-pass filter 165. Since the DC voltage $V_{CC}$ has a magnitude of only 5 $V_{DC}$, the gate drive comparison circuit 164 does not include the zener diode Z10 to reduce the voltage at the negative input of the comparator U12 to the appropriate level. The amount of delay introduced by the gate drive comparison circuit 164 is dependent upon the duty cycle of the control signal BST_DLY.

Figure 10:
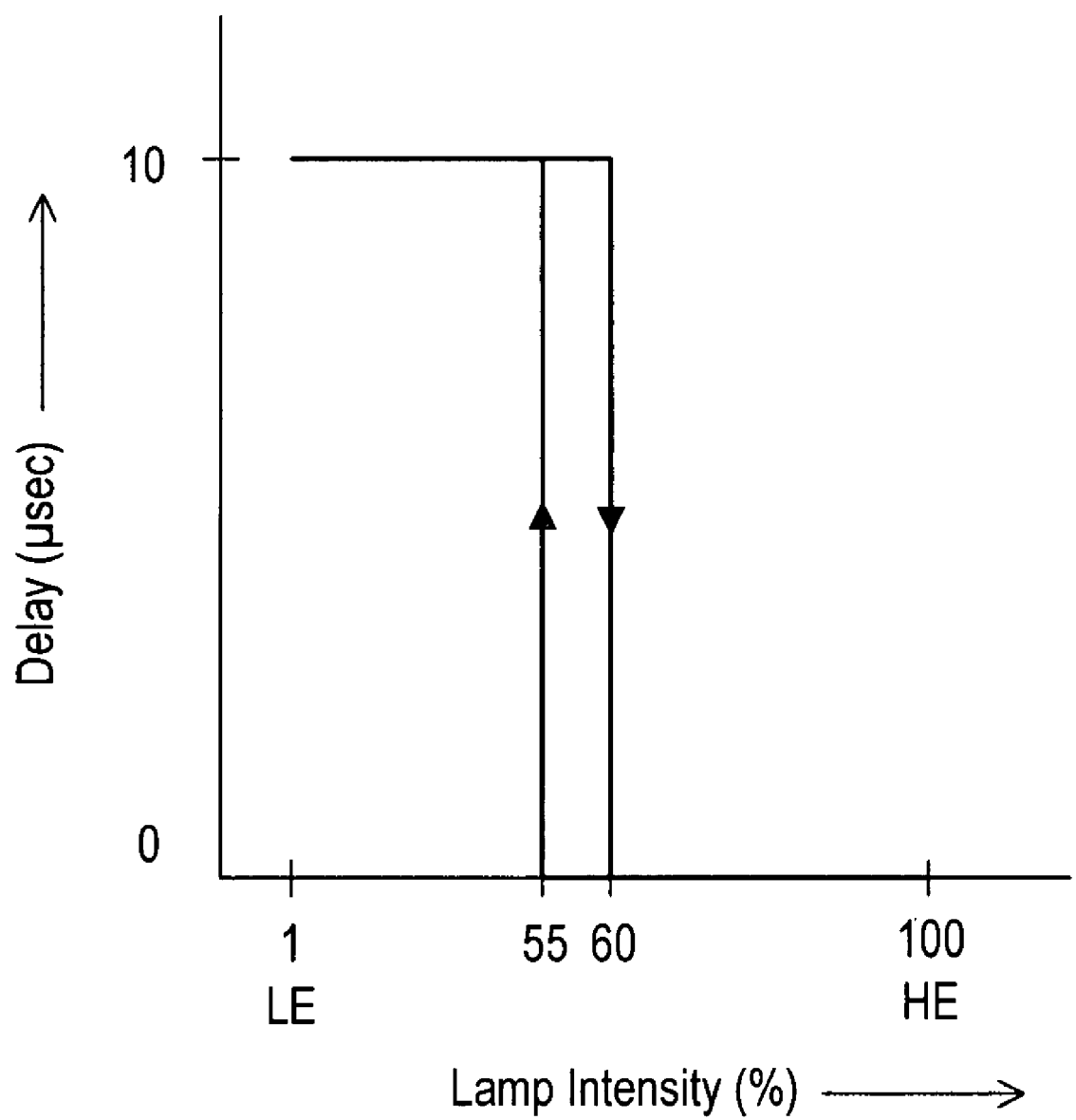
FIG. 10 is a plot of the amount of delay introduced by the delay circuit of FIG. 8 versus the desired lighting intensity of the lamp according to a first embodiment of the present invention.

FIG. 10 is a plot of the amount of delay introduced by the delay circuit 160 versus the desired lighting intensity of the lamp 105 according to a first embodiment of the present invention. Preferably, the control circuit 150 drives the control signal BST_DLY high (i.e., to approximately the DC voltage $V_{CC}$ of the power supply 158) or low (i.e., to approximately circuit common), such that the delay circuit 160 introduces delay into the current through the inductor L1 at two discrete levels. According to the first embodiment of the present invention, the delay circuit 160 introduces a first amount of delay (e.g., 10 µsec) into the operation of the boost converter 126 when the desired intensity is below a first threshold intensity (e.g., approximately 55% of the high-end intensity). The delay circuit 160 introduces substantially no delay into the operation of the boost converter 126 when the desired intensity is above a second threshold intensity (e.g., approximately 60% of the high-end intensity). Preferably, hysteresis is provided as shown in FIG. 10.

Further, the control circuit 150 controls the duty cycle of the control signal BST_DLY in response to the magnitude of the AC mains voltage, i.e., the signal representative of the magnitude of the rectified voltage provided the resistors R194, R196. Preferably, when the magnitude of the AC mains voltage is approximately 120 $V_{AC}$, the duty cycle of the control signal BST_DLY is controlled such that no delay is ever introduced into the operation of the boost converter 126, i.e., the boost converter 126 operates independently of the desired intensity of the lamp 105. On the other hand, if the AC mains voltage is approximately 277 $V_{AC}$, the control circuit 150 controls the duty cycle of the control signal BST_DLY, such that the boost converter 126 operates as shown in FIG. 10.

Figure 11:
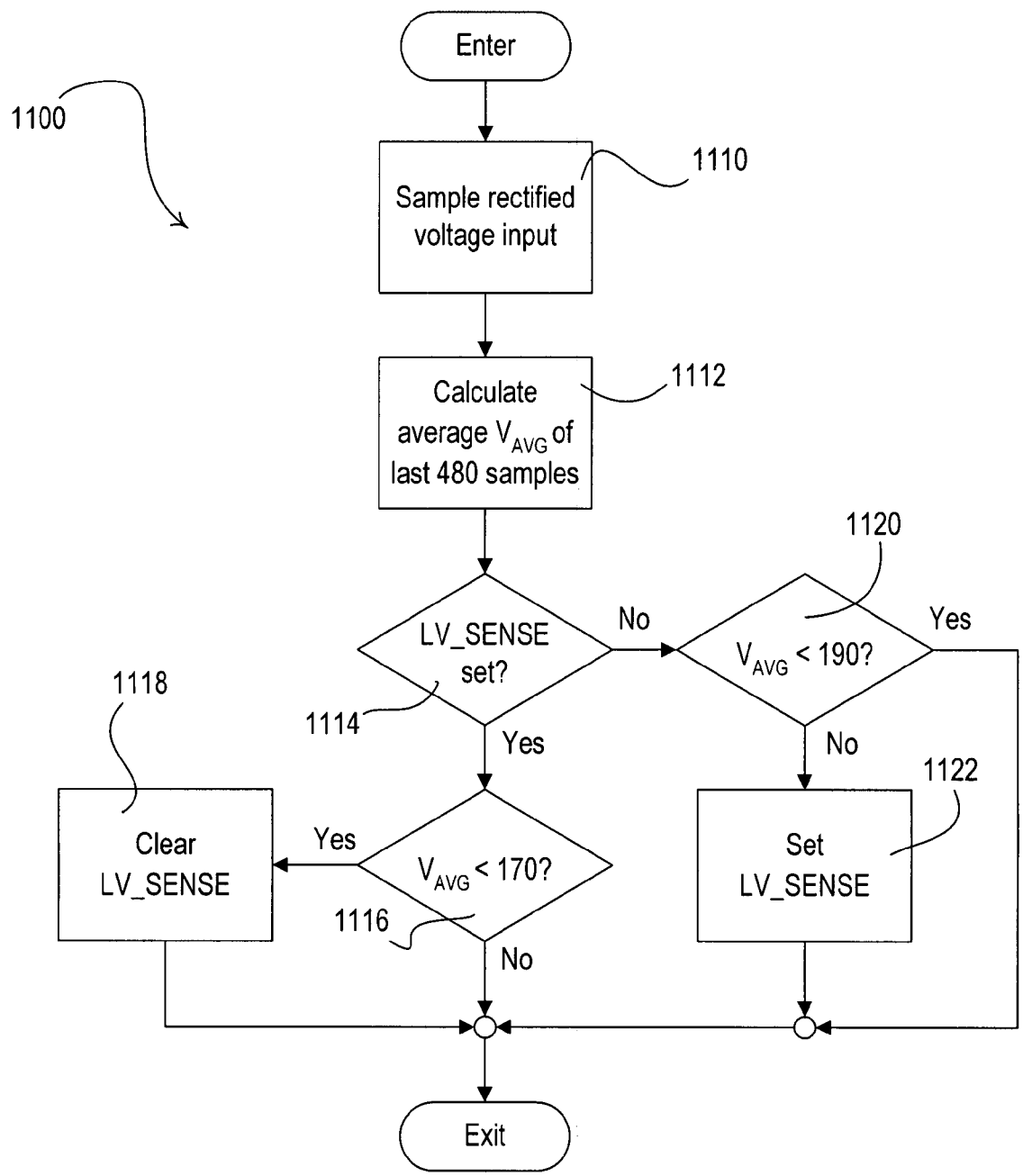
FIG. 11 is a simplified flowchart of a line voltage sense procedure executed by a control circuit of the ballast of FIG. 7.

FIG. 11 is a simplified flowchart of a line voltage sense procedure 1100 executed by the control circuit 150 periodically, e.g., every 208 µsec. The control circuit 150 sets a variable LV_SENSE when the magnitude of the AC mains voltage is approximately 277 $V_{AC}$, and clears the variable LV_SENSE when the magnitude of the AC mains voltage is approximately 120 $V_{AC}$. The line voltage sense procedure 1100 includes some hysteresis, i.e., the control circuit 150 sets the variable LV_SENSE when the magnitude of the AC mains voltage rises above approximately 190 $V_{AC}$, but does not clear the variable LV_SENSE until the magnitude of the AC mains voltage falls below approximately 170 $V_{AC}$ (or vice versa).

Referring to FIG. 11, the control circuit 150 samples the signal representative of the magnitude of the rectified voltage provided the resistors R194, R196 using an analog-to-digital converter (ADC) at step 1110. At step 1112, an average value $V_{AVG}$ is calculated from the last 480 samples of the rectified voltage (i.e., the samples taken over the last 100 msec are averaged). If the variable LV_SENSE is set at step 1114 and the average value $V_{AVG}$ calculated at step 1112 is less than approximately 170 $V_{AC}$ at step 1116, the variable LV_SENSE is cleared at step 1118. If the variable LV_SENSE is not set at step 1114, but the average value $V_{AVG}$ is greater than or equal to approximately 190 $V_{AC}$ at step 1120, the variable LV_SENSE is set at step 1122. Otherwise, the variable LV_SENSE is not changed before the procedure 1100 exits.

Figure 12:
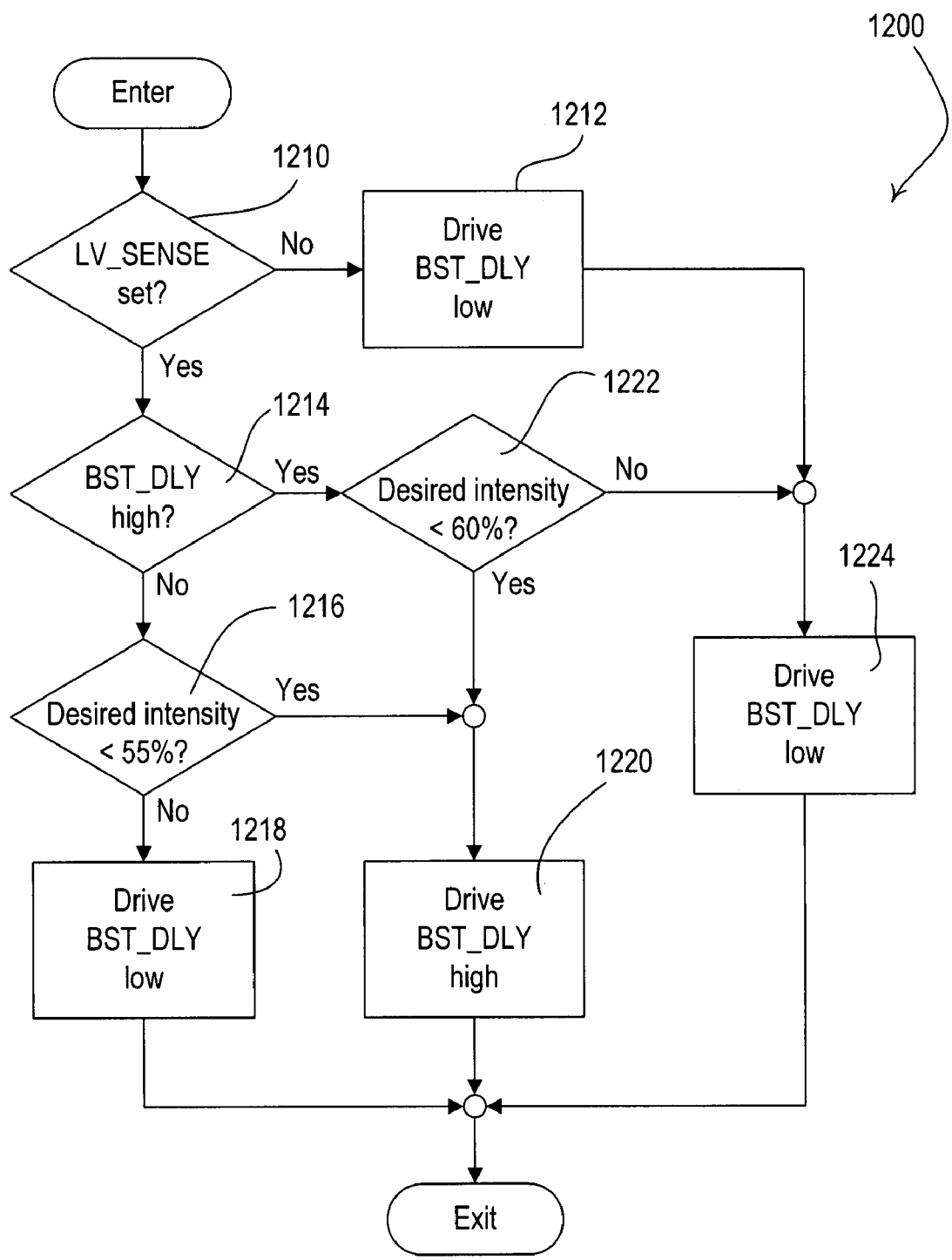
FIG. 12 is a simplified flowchart of a delay procedure executed by the control circuit of the ballast of FIG. 7 according to the first embodiment of the present invention.

FIG. 12 is a simplified flowchart of a delay procedure 1200 executed by the control circuit 150 periodically, e.g., every 2.5 msec, according to the first embodiment of the present invention. Using the delay procedure 1200, the control circuit 150 controls the operation of the transistor Q1 (via the control signal BST_DLY) in response to the desired intensity of the lamp 105 and the variable LV_SENSE. The control circuit 150 drives the control signal BST_DLY high, such that the delay circuit 160 introduces the amount of delay (i.e., 10 µsec) into the operation of the boost converter 126. The control circuit 150 drives the control signal BST_DLY low to operate the boost converter 126 in critical conduction mode.

If the variable LV_SENSE is not set at step 1210 (i.e., the ballast is coupled to an AC mains line voltage of 120 $V_{AC}$), the control circuit 150 drives the control signal BST_DLY low at step 1212, such that the delay circuit 160 does not introduce any delay into the operation of the boost converter 126. If the variable LV_SENSE is set at step 1210, a determination is made at step 1214 as to whether the control signal BST_DLY is presently being driven high. If the control signal BST_DLY is low at step 1214, and the desired intensity is not less than 55% at step 1216, the control signal BST_DLY is driven low at step 1218. However, if the desired intensity has been controlled below 55% at step 1216, the control signal BST_DLY is driven high at step 1220, such that the boost converter 126 begins to operate in discontinuous conduction mode.

If the variable BST_DLY is high at step 1214, and the desired intensity has not risen above 60% at step 1222, the control circuit 150 continues to drive the control signal BST_DLY high at step 1220. However, once the desired intensity is greater than or equal to 60% at step 1222, the control signal BST_DLY is driven low at step 1224 and the delay procedure 1200 exits.

Figure 13:
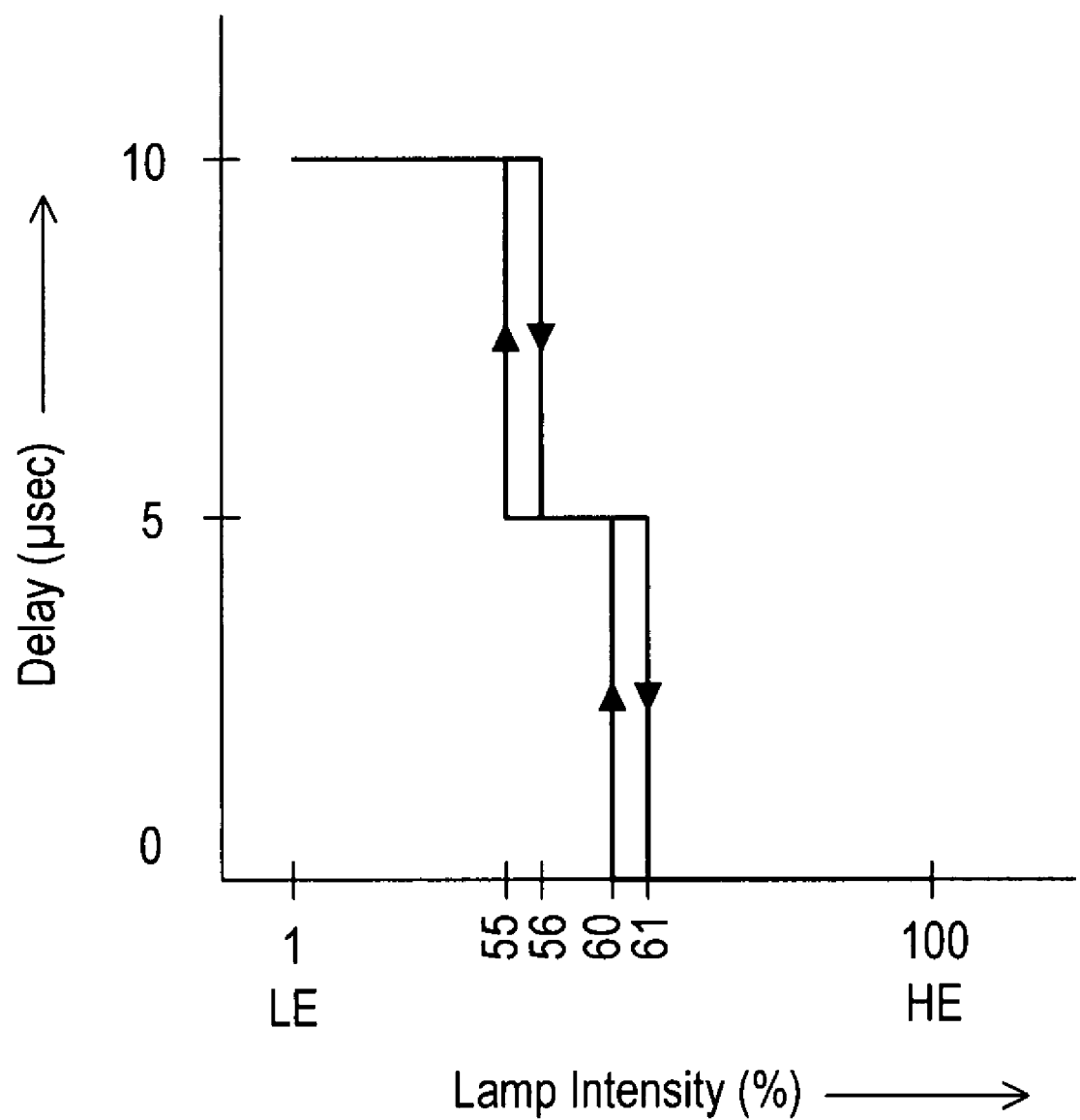
FIG. 13 is a plot of the amount of delay introduced by the delay circuit of FIG. 8 versus the desired lighting intensity of the lamp according to a second embodiment of the present invention.

Alternatively, the control circuit 160 may be operable to pulse-width modulate (PWM) the control signal BST_DLY, such that the amount of delay produced by the delay circuit 160 is provided at one or more intermediates steps between the first threshold intensity and the second threshold intensity. FIG. 13 is a plot of the amount of delay introduced by the delay circuit 160 versus the desired lighting intensity of the lamp 105 according to a second embodiment of the present invention. When the desired intensity is below approximately 55%, the control circuit 150 drives the control signal BST_DLY high to introduce approximately 10 µsec of delay into the operation of the boost converter 126. When the desired intensity is above approximately 61%, the control circuit 150 drives the control signal BST_DLY low, such that no delay is provided. When the desired intensity is below approximately 60%, but above approximately 56%, the control circuit 150 generates the control signal BST_DLY as a PWM signal to provide approximately 5 µsec of delay. Preferably, the control signal BST_DLY has a duty cycle of 50% and a period of 5 msec. Once again, hysteresis is provided between the high, intermediate, and low levels of delay as shown in FIG. 13.

Figure 14:
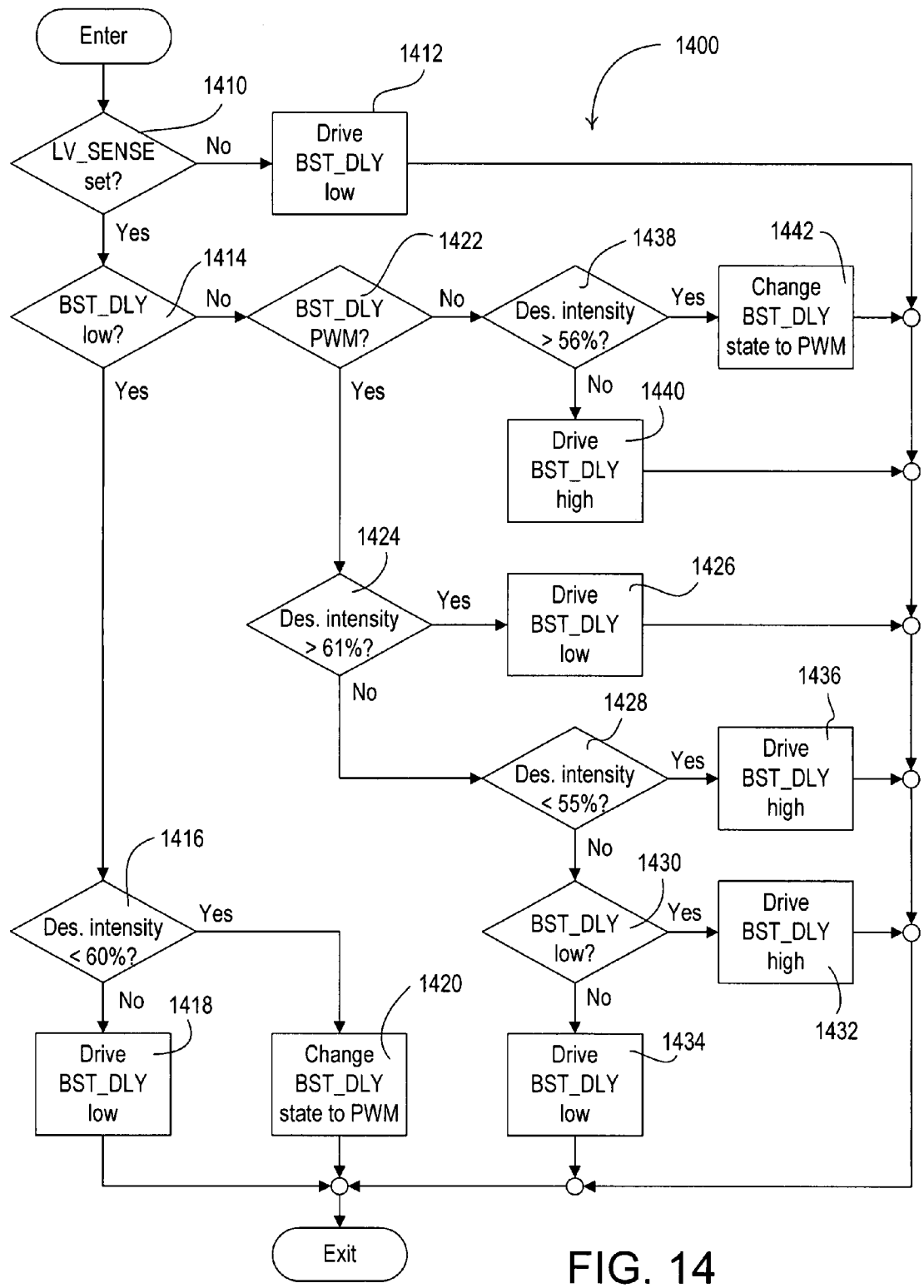
FIG. 14 is a simplified flowchart of a delay procedure executed by the control circuit of the ballast of FIG. 7 according to the second embodiment of the present invention.

FIG. 14 is a simplified flowchart of a delay procedure 1400 according to the second embodiment of the present invention. The delay procedure 1400 is executed by the control circuit

150 periodically, e.g., every 2.5 msec. If the variable LV_SENSE is not set at step 1410, the ballast is coupled to an AC mains line voltage of approximately 120 $V_{AC}$. Accordingly, the control circuit 150 drives the control signal BST_DLY low at step 1412, such that no delay is provided by the delay circuit 160, and the procedure 1400 exits.

If the variable LV_SENSE is set at step 1410 and the control signal BST_DLY is presently being driven low at step 1414, a determination is made at step 1416 as to whether the desired intensity is less than 60%. If the desired intensity is less than 60% at step 1416, control signal continues to drive the control signal BST_DLY low at step 1418. Otherwise, the state of the control signal BST_DLY is changed to PWM at step 1420, such that the control circuit 150 begins to drive the control signal BST_DLY with a duty cycle to provide the intermediate amount of delay, i.e., 5 µsec.

If the control signal BST_DLY is not being driven low at step 1414, but the control signal BST_DLY is in the PWM state at step 1422, a determination is made at step 1424 as to whether the desired intensity has risen above approximately 61%. If so, the control circuit 150 once again drives the control signal BST_DLY low at step 1426 to operate the boost converter 126 in critical conduction mode. However, if the desired intensity is not greater than 61% at step 1424 and the desired intensity is not less than 55% at step 1428, the control circuit 150 toggles the control signal BST_DLY to provide the PWM signal to the delay circuit 160 and thus the intermediate amount of delay. Specifically, if the control signal BST_DLY is low at step 1430, the control circuit 150 drives the control signal BST_DLY high at step 1432 and the procedure 1400 exits. If the control signal BST_DLY is high at step 1430, the control circuit 150 drives the control signal BST_DLY low at step 1434 and the procedure 1400 exits. Since the delay procedure 1400 is executed approximately every 2.5 msec, the control signal BST_DLY has a period of approximately 5 msec with a duty cycle of 50% when the control signal BST_DLY is in the PWM state. When the control circuit 150 is driving the control signal BST_DLY as the PWM signal at step 1422, and the desired intensity drops below 55% at step 1428, the control circuit 150 drives the control signal BST_DLY high to provide approximately 10 µsec of delay.

If the control signal BST_DLY is not in the PWM state at step 1422 (i.e., the control signal BST_DLY is presently being driven high), a determination is made at step 1438 as to whether the desired intensity is greater than 56%. If the desired intensity is greater than 56% at step 1438, the control circuit 150 simply continues to drive the control signal BST_DLY high at step 1440. However, if the desired intensity has fallen below 56% at step 1438, the control circuit 150 begins to drive the control signal BST_DLY as a PWM signal at step 1442.

Accordingly, the boost converter 126 of the ballast 100 of the present invention is not limited by the minimum output power requirements of the prior art boost converter 26. The ballast 100 according to the present invention provides a wide range of output power, which corresponds to a wide range of input power, e.g., from 6 W to 120 W. The ballast 100 is able to provide a maximum input power that is at least twenty (20) times greater than the minimum input power, i.e., the ratio of the maximum input power over the minimum input power is equal to at least twenty. The ballast 100 of the present invention is also a universal-input ballast, i.e., the ballast can operates across a range of input voltages (e.g., from approximately 120 $V_{AC}$ to 277 $V_{AC}$).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic dimming ballast for driving a gas discharge lamp, the electronic ballast comprising:
    a rectifier operable to receive an AC input voltage from an AC supply and to produce a rectified voltage having a peak magnitude;
    a boost converter operable to receive the rectified voltage and to produce a substantially DC bus voltage having a DC magnitude greater than the peak magnitude of the rectified voltage, the boost converter operable to operate in critical conduction mode;
    an inverter operable to convert the DC bus voltage to a high-frequency AC output voltage to drive the lamp; and
    a control circuit operable to receive a desired light level signal representative of a desired intensity of the lamp, and to provide a first control signal to the inverter and a second control signal to the boost converter;
    wherein the boost converter is operable to operate in discontinuous conduction mode when the desired intensity of the lamp is below a first threshold intensity.

2. The ballast of claim 1, wherein the boost converter is operable to operate in critical conduction mode when the desired intensity is above a second threshold intensity.

3. The ballast of claim 2, wherein the boost converter comprises a delay circuit operable to receive the second control signal and to control the conduction of current through the boost converter, the second control signal representative of the desired intensity, such that the delay circuit is responsive to the desired intensity of the lamp.

4. The ballast of claim 3, wherein the delay circuit is operable to introduce a first amount of delay into the conduction of current through the boost converter when the desired intensity is below the first threshold intensity, and no delay when the desired intensity is above the second threshold intensity.

5. The ballast of claim 4, the delay circuit is operable to introduce a second amount of delay into the conduction of current through the boost converter when the desired intensity is between the first and second threshold intensities, the second amount of delay less than the first amount of delay.

6. The ballast of claim 5, wherein the control circuit is operable to provide the second control signal as a pulse-width modulated signal to provide the second amount of delay.

7. The ballast of claim 5, wherein the first amount of delay is approximately ten microseconds and the second amount of delay is approximately 5 microseconds.

8. The ballast of claim 2, wherein the first threshold intensity is less than the second threshold intensity.

9. The ballast of claim 8, wherein the boost converter begins to operate in the discontinuous mode when the desired intensity drops below the first threshold intensity, after which, the boost converter begins to operate in the critical conduction mode only if the desired intensity rises back above the second threshold intensity.

10. The ballast of claim 2, wherein the first threshold intensity and the second threshold intensity are programmable.

11. The ballast of claim 2, wherein the control circuit comprises a microprocessor.

12. The ballast of claim 2, wherein the second control signal comprises a pulse-width modulated signal.

13. The ballast of claim 3, wherein the control circuit receives a signal representative of the magnitude of the rectified voltage.

14. The ballast of claim 13, wherein the control circuit provides the second control signal to the delay circuit is response to the magnitude of the rectified voltage.

15. The ballast of claim 4, wherein the first amount of delay is approximately ten microseconds.

16. A boost converter for an electronic ballast for driving a gas discharge lamp to a desired intensity, the boost converter operable to receive a rectified voltage and to charge a bus capacitor to produce a substantially DC bus voltage having a DC magnitude greater than a peak magnitude of the rectified voltage, the boost converter comprising:
a semiconductor switch having a control input;
an energy storage element operable to charge when the semiconductor switch is conductive and to discharge into the bus capacitor when the semiconductor switch is non-conductive; and
a control circuit operatively coupled to the control input of the semiconductor switch to render the semiconductor switch conductive and non-conductive to selectively charge and discharge the energy storage element, such that the boost converter operates in critical conduction mode;
wherein the control circuit is further operable to control the semiconductor switch to operate the boost converter in discontinuous conduction mode when the desired intensity of the lamp is below a first threshold intensity.

17. The boost converter of claim 16, wherein the control circuit is operable to operate the boost converter in critical conduction mode when the desired intensity is above a second threshold intensity greater than the first threshold intensity.

18. The boost converter of claim 17, further comprising:
a delay circuit coupled between the control circuit and the control input of the semiconductor switch, the delay circuit responsive to the control circuit to control the conduction of current through the boost converter to introduce a first amount of delay into the conduction of current through the boost converter when the desired intensity is below the first threshold intensity, and no delay when the desired intensity is above the second threshold intensity.

19. The boost converter of claim 18, wherein the control circuit is operable to drive the delay circuit with a pulse-width modulated signal.

20. The boost converter of claim 19, wherein the control circuit is operable to drive the delay circuit with a pulse-width modulated signal to provide a second amount of delay into the conduction of the current through the boost converter.

21. The boost converter of claim 17, wherein the energy storage element comprises an inductor.

22. A method of boosting a rectified voltage to produce a substantially DC bus voltage using a boost converter of an electronic ballast for driving a gas discharge lamp, the DC bus voltage having a DC magnitude greater than a peak magnitude of the rectified voltage, the method comprising the steps of:
receiving a desired intensity of the lamp;
operating the boost converter in critical conduction mode;
determining if the desired intensity is below a first threshold intensity; and
operating the boost converter in discontinuous conduction mode when the desired intensity of the lamp is below the first threshold intensity.

23. The method of claim 22, wherein the step of operating the boost converter in discontinuous conduction mode comprises introducing a first amount of delay into the conduction of current through the boost converter.

24. The method of claim 23, wherein the step of operating the boost converter in critical conduction mode comprises introducing no delay into the conduction of current through the boost converter.

25. The method of claim 23, further comprising the step of:
introducing a second amount of delay into the conduction of current through the boost converter.

26. The method of claim 22, further comprising the steps of:
determining if the desired intensity is above a second threshold intensity; and
operating the boost converter in critical conduction mode when the desired intensity of the lamp is above the second threshold intensity.

27. An electronic dimming ballast for driving a gas discharge lamp, the electronic ballast comprising:
a rectifier operable to receive an AC input voltage from an AC supply and to produce a rectified voltage having a peak magnitude;
a boost converter operable to receive the rectified voltage and to produce a substantially DC bus voltage having a DC magnitude greater than the peak magnitude of the rectified voltage, the boost converter operable to operate in critical conduction mode;
an inverter operable to convert the DC bus voltage to a high-frequency AC output voltage to drive the lamp; and
a control circuit operable to receive a desired light level signal representative of a desired intensity of the lamp, and to provide a first control signal to the inverter and a second control signal to the boost converter, such that the boost converter operates in discontinuous conduction mode when the desired intensity of the lamp is below a first threshold intensity;
wherein the boost converter is characterized by a minimum input power and a maximum input power, such that the ratio of the maximum input power over the minimum input power is greater than 20.

28. The ballast of claim 27, wherein the boost converter is characterized by a minimum operating frequency of 20 kHz.

* * * * *